US008308611B2

United States Patent
Rangaraju et al.

(10) Patent No.: US 8,308,611 B2
(45) Date of Patent: Nov. 13, 2012

(54) SHIFT CONTROL SYSTEMS AND METHODS FOR AN AUTOMATIC TRANSMISSION

(75) Inventors: Shashikanth Rangaraju, Novi, MI (US); Robert L. Williams, Holly, MI (US); Matthew D. Whitton, Howell, MI (US)

(73) Assignee: GM Global Technology Operations LLC

( * ) Notice: Subject to any disclaimer, the term of this patent is extended or adjusted under 35 U.S.C. 154(b) by 421 days.

(21) Appl. No.: 12/692,043

(22) Filed: Jan. 22, 2010

(65) Prior Publication Data

US 2011/0183809 A1 Jul. 28, 2011

(51) Int. Cl.
*F16H 61/26* (2006.01)
*G06F 7/00* (2006.01)

(52) U.S. Cl. .......................................... 477/135; 701/66
(58) Field of Classification Search .................. 477/34, 477/132, 133, 135, 136, 139, 141, 140; 701/64, 701/66
See application file for complete search history.

(56) References Cited

U.S. PATENT DOCUMENTS

| 5,624,351 | A  | * | 4/1997 | Fujita et al. | 477/148 |
| 6,064,935 | A  | * | 5/2000 | You | 701/55 |
| 6,454,678 | B1 | * | 9/2002 | Lee | 477/141 |
| 6,511,401 | B2 | * | 1/2003 | Lee | 477/131 |
| 6,554,741 | B2 | * | 4/2003 | Saito | 477/120 |
| 6,577,939 | B1 | * | 6/2003 | Keyse et al. | 701/55 |
| 7,212,898 | B2 |   | 5/2007 | Whitton et |  |
| 7,384,375 | B2 | * | 6/2008 | Yamada et al. | 477/143 |
| 8,180,536 | B2 | * | 5/2012 | Suzuki et al. | 701/51 |
| 2009/0280958 | A1 | * | 11/2009 | Yim et al. | 477/115 |
| 2010/0312442 | A1 | * | 12/2010 | Ahn | 701/64 |

FOREIGN PATENT DOCUMENTS

JP 04194452 A * 7/1992 ............ 477/141

* cited by examiner

*Primary Examiner* — Roger Pang

(57) ABSTRACT

A transmission shift control system includes a transmission shift control module that executes an upshift or a closed-throttle downshift, a shift stage determination module, and a clutch control module. The stage determination module determines a stage of the upshift or the closed throttle downshift when a downshift is requested. The clutch control module determines a downshift type based on the stage of the upshift or the closed throttle downshift and selectively executes a downshift before the upshift or the closed throttle downshift is completed.

20 Claims, 7 Drawing Sheets

| RANGE \ CLUTCH | C1 | C2 | C3 | C4 | C5 |
|---|---|---|---|---|---|
| 1st | X |   |   |   | X |
| 2nd | X |   |   | X |   |
| 3rd | X |   | X |   |   |
| 4th | X | X |   |   |   |
| 5th |   | X | X |   |   |
| 6th |   | X |   | X |   |
| R |   |   | X |   | X |
| N |   |   |   |   | X |

FIG. 5

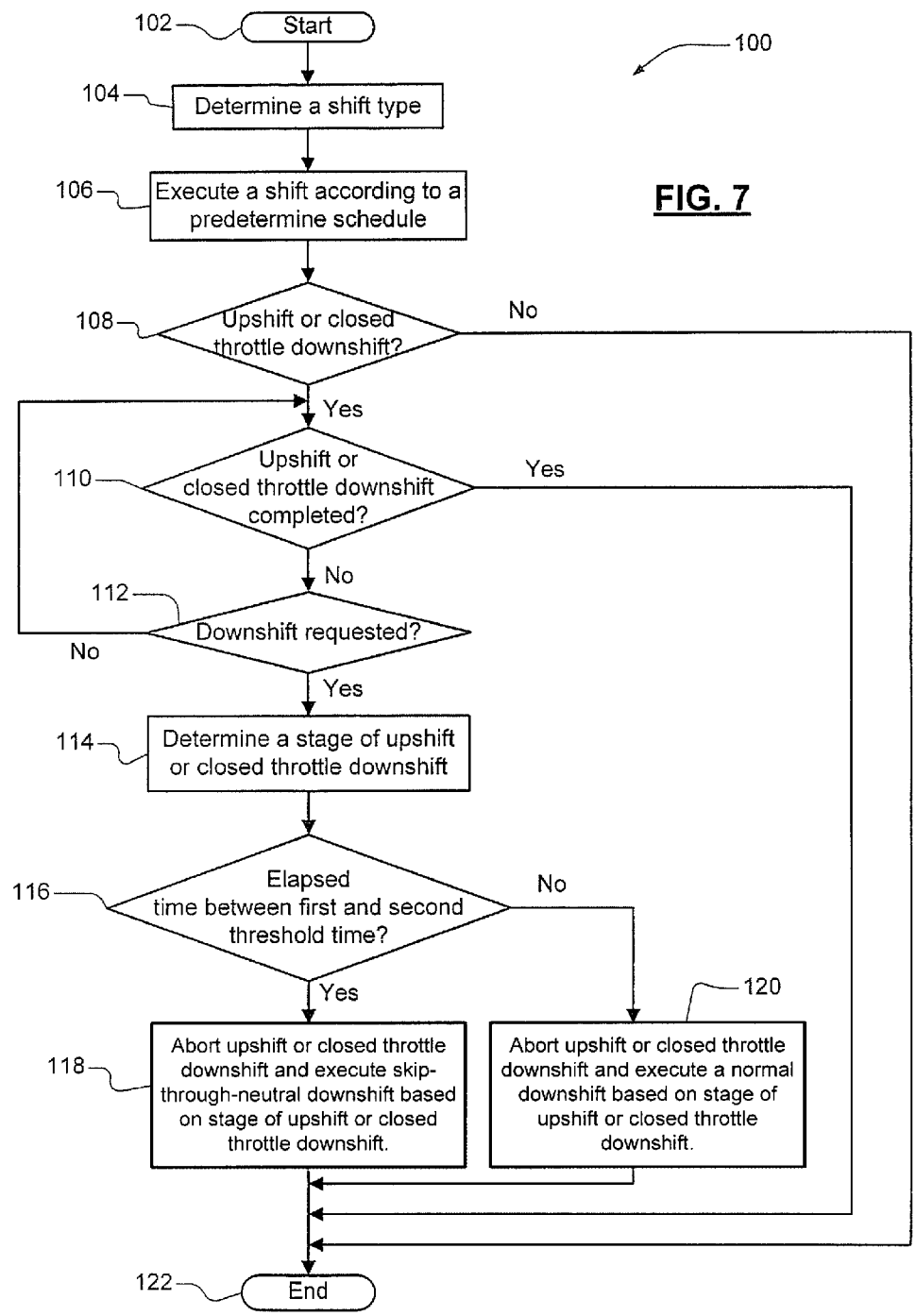

SHIFT CONTROL SYSTEMS AND METHODS FOR AN AUTOMATIC TRANSMISSION

FIELD

The present disclosure relates to automatic transmissions, and more particularly to shift control systems and methods for improved shift response time.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An automatic transmission for a motor vehicle generally includes a number of gear elements and torque establishing devices such as clutches and brakes. The clutches and brakes are selectively engageable to activate certain gear elements to establish a desired speed ratio between a transmission input shaft and a transmission output shaft.

The transmission input shaft is connected to an engine through a fluid coupling such as a torque converter. The transmission output shaft is connected to vehicle wheels. Gear shifting from one forward speed ratio to another may be performed in response to changes in throttle opening and vehicle speed.

In a typical automatic transmission while accelerating the vehicle, when a driver lifts his/her foot off of the accelerator pedal, an upshift to a higher gear may be triggered. If the driver then depresses the accelerator pedal during an upshift to resume acceleration, a downshift for vehicle acceleration may be commanded. This downshift may not be executed until the upshift is completed. As a result, the acceleration may be delayed.

In a typical automatic transmission, while decelerating the vehicle during a coast down (with a driver's foot off the accelerator pedal), a closed throttle downshift may be triggered. If the driver then depresses the accelerator pedal during the closed throttle downshift to accelerate, a downshift for acceleration may be commanded. This downshift may not be executed until the closed throttle downshift is completed. As a result, the acceleration may be delayed.

SUMMARY

A transmission shift control system according to the present disclosure includes a transmission shift control module that executes an upshift or a closed throttle downshift, a shift stage determination module, and a clutch control module. The shift stage determination module determines a stage of an upshift or a closed throttle downshift when a downshift is requested while the upshift or closed throttle downshift is performed. The clutch control module determines a downshift type based on the stage of an upshift or a closed throttle downshift and selectively executes a downshift before the upshift or closed throttle downshift is completed.

A method for controlling gear shift includes: executing an upshift or a closed throttle downshift; determining a stage of the upshift or the closed throttle downshift; determining a downshift type based on the stage of the upshift or the closed throttle downshift; and selectively executing a downshift based on the stage of the upshift or the closed throttle downshift before the upshift or closed throttle downshift is completed.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a table indicating a relationship between transmission clutch activation and gearbox engaged gear states;

FIG. 7 is a flow diagram of a method for controlling gear shift in accordance with the teachings of the present disclosure.

DETAILED DESCRIPTION

Figure 1:
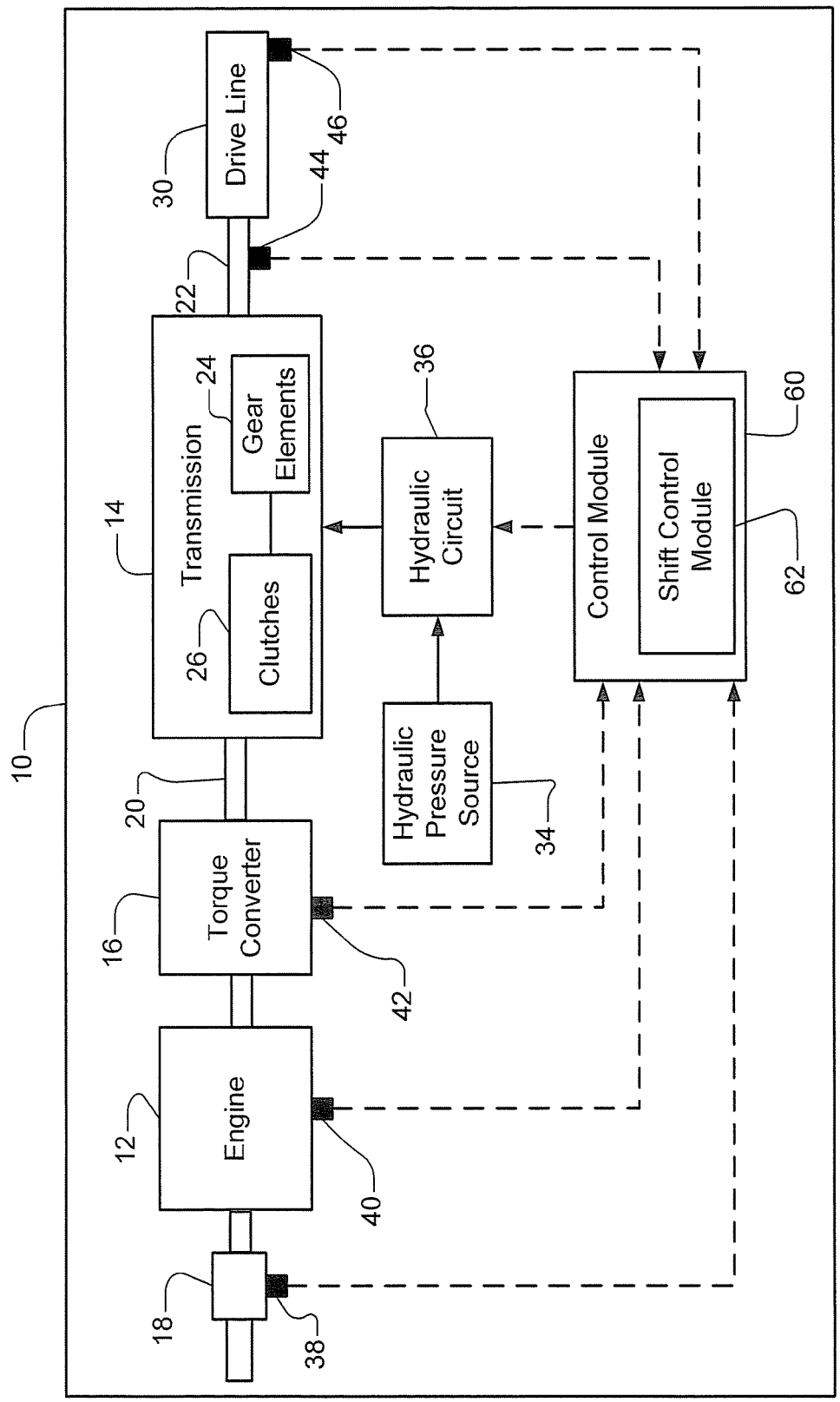
FIG. 1 is a functional block diagram of a vehicle that includes a shift control module in accordance with the teachings of the present disclosure.

The following description is merely exemplary in nature and is in no way intended to limit the disclosure, its application, or usage. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that executes one or more software or firmware programs, a combinational logic circuit, and/or other suitable components that provide the described functionality.

In previous implementations of the control system for the asynchronous clutch-to-clutch automatic transmissions, only a small window of opportunity exists to allow an initial shift to be aborted and a new shift to be executed when the new shift is requested before the initial shift is completed. More specifically, if the driver desires increased vehicle acceleration during a closed-throttle upshift or a coast-down downshift and steps into the accelerator pedal such that a power downshift is commanded, only a small window of opportunity exists. When the driver steps into the accelerator pedal during the small window, the initial shift is aborted and a new power downshift is initiated. When the driver steps into the accelerator pedal outside of this window, the initial shift would have to continue to completion before the subsequent downshift could be scheduled. The time that it would take for the initial shift to complete and the subsequent downshift to commence would be perceived by the driver as an undesirable performance delay.

The present invention provides a method and apparatus to significantly reduce the delay between the driver pedal input and the downshift command due to the pedal step-in. This is accomplished by allowing the abort out of the initial lift-foot upshift or closed-throttle downshift into the power downshift at any time in the initial shift. This basis for the power downshift control is the Power-On Skip Through Neutral Downshift technology previously developed by General Motors (U.S. Pat. No. 7,212,898) and further developed for use under these particular conditions.

When the abort occurs, any holding clutches from the previous gear state will be dropped and the transmission will be temporarily placed in a neutral state during the ratio change. Simultaneously the control system will calculate and control engine torque to perform the ratio change and obtain the synchronous speed of the new destination gear within a desired shift time. The two required clutches for the destination gear state are controlled such that they will be filled and can come up to capacity to hold the destination gear once the destination synchronous speed is attained. Since this event was initiated from a lift-foot upshift or closed-throttle downshift conditions that are typically at zero or negative drive torque, the momentary shift through neutral state is not objectionable to the driver and the result is a reactive and sporty vehicle response.

A shift control system according to the present disclosure selectively executes a skip-through-neutral downshift when a downshift request is received during a lift-foot upshift, power-on upshift or a closed throttle downshift. The skip-through-neutral downshift transitions the transmission to a neutral state where both holding clutches associated with an attained gear are disengaged, engine torque/speed control is used to control the turbine speed change and the required oncoming clutches for the commanded gear are applied. This shift control system allows a downshift to be initiated before the upshift is completed, in fact virtually at any point in the upshift.

Referring now to FIG. 1, a vehicle 10 includes an engine 12 that drives a transmission 14 through a torque converter 16. Air is drawn into the engine 12 through a throttle 18. The air is mixed with fuel and combusted within cylinders (not shown) of the engine 12 to produce engine torque. The torque converter 16 transmits the engine torque to the transmission 14 via a transmission input shaft 20. The transmission 14 may be a multi-speed automatic clutch-to-clutch transmission that drives a transmission output shaft 22 based on the engine torque. The transmission 14 may include gear elements 24 and friction elements, such as, for example only, clutches 26.

The transmission output shaft 22 drives a driveline 30 of the vehicle 10. The speed and torque relationships between the engine 12 and the driveline 30 are controlled by hydraulically engaging the gear elements 24 to suitable ones of the clutches 26. Pressurized fluid is provided to the clutches 26 from a hydraulic pressure source 34. Hydraulic circuits 36 include solenoids and control valves (not shown) that regulate pressure applied to the clutches 26 by supplying or discharging fluid to/from chambers of the clutches 26. The clutches 26 are selectively engaged to provide neutral, a plurality of forward drive ratios, and one reverse drive ratio.

A plurality of sensors monitor engine operating conditions. The plurality of sensors include, but are not limited to, a throttle position sensor 38, an engine speed sensor 40, a turbine speed sensor 42, a transmission output speed sensor 44, and a vehicle speed sensor 46. The throttle position sensor 38 measures a throttle position and consequently a throttle opening. The engine speed sensor 40 measures engine speed. The turbine speed sensor 42 measures rotational speed of a turbine of the torque converter 16. The turbine is connected to the transmission input shaft 20. Therefore, the turbine speed indicates the speed of the transmission input shaft 20. The transmission output speed sensor 44 measures a rotational speed of the transmission output shaft 22. The vehicle speed sensor 46 measures the vehicle speed.

A control module 60 receives signals from the plurality of sensors and controls the engine 12 and transmission 14 accordingly. The control module 60 includes a shift control module 62 that allows for execution of a downshift during an upshift based on the stages of the upshift. The downshift may be a skip-through-neutral downshift (or a powerdown skip via neutral shift, "PDSVN" shift) that transitions the transmission 14 to a neutral state. In the neutral state, both holding clutches associated with an attained gear are disengaged, turbine speed is controlled by controlling engine torque/speed, and the required oncoming clutches for the commanded gear are applied.

Figure 2:
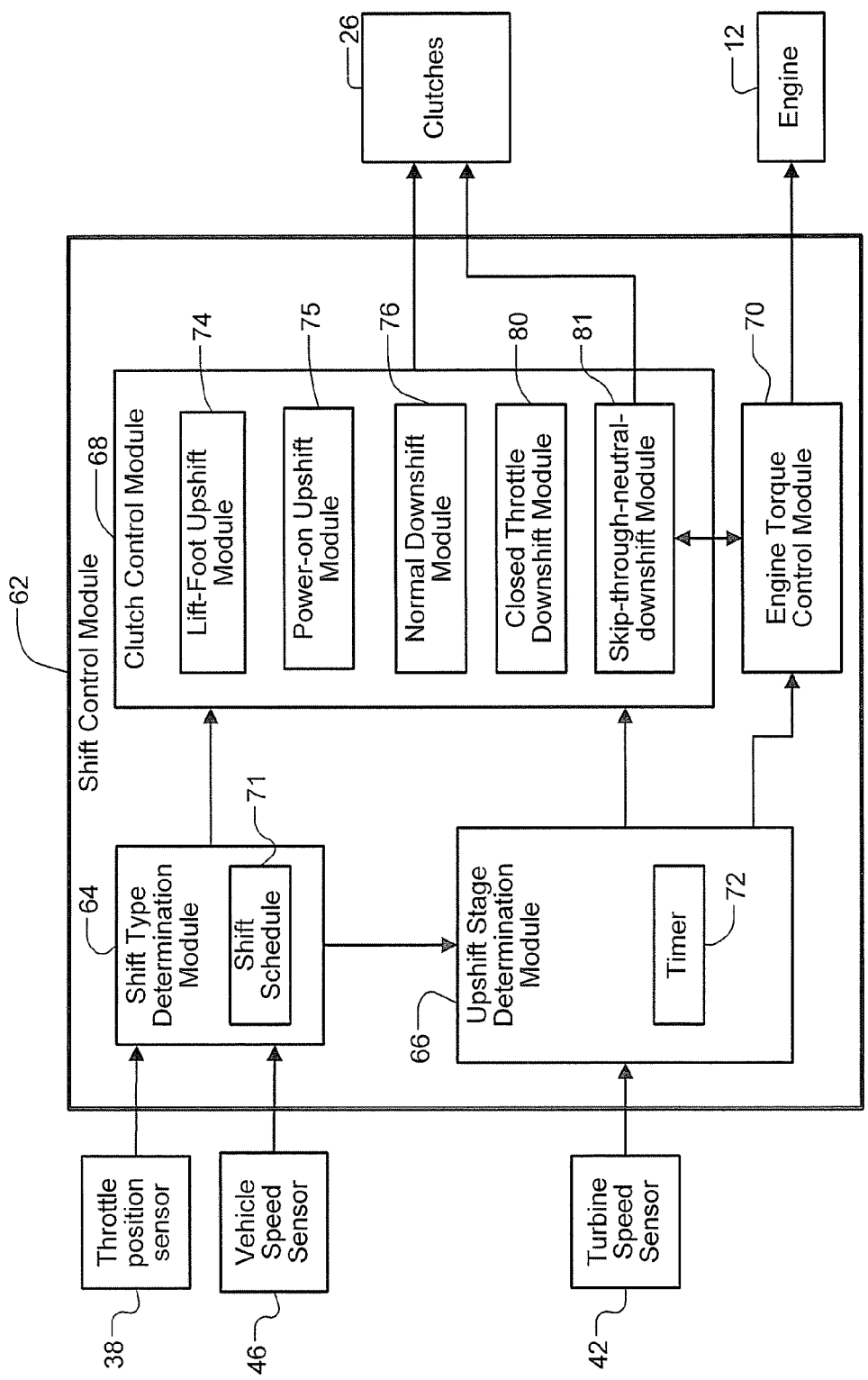
FIG. 2 is a functional block diagram of a shift control module in accordance with the teachings of the present disclosure.

Referring to FIG. 2, the shift control module 62 includes a shift type determination module 64, an upshift stage determination module 66, a clutch control module 68, and an engine torque control module 70. The shift type determination module 64 communicates with the throttle position sensor 38 and the vehicle speed sensor 46 and determines a desired shift based on the throttle opening and the vehicle speed. The shift type determination module 64 includes a shift schedule 71 that relates to a throttle opening and a vehicle speed to a gear ratio.

A gear ratio is a ratio of a transmission input speed (i.e., turbine speed) over a transmission output speed. A desired gear ratio may be determined based on current throttle opening, a current vehicle speed, and the shift schedule 71. A gear shift is commanded when the commanded (i.e., desired) gear ratio is different from the attained (i.e., current) gear ratio. The gear shift types are determined based on the attained gear ratio, the commanded gear ratio, throttle opening, a rate of change in throttle opening, vehicle speed and rate of change in the vehicle speed.

For example, an upshift may be executed when the commanded gear ratio is less than the attained gear ratio. Upshift may further include a power-on upshift or a lift-foot upshift depending on the rate of change in throttle opening and the vehicle speed. A power-on upshift may be executed when an accelerator pedal is depressed, vehicle acceleration is expected and the upshift is performed under positive delivered engine torque. A lift-foot upshift may be executed when the accelerator pedal is released.

A downshift may be executed when the commanded gear ratio is greater than the attained gear ratio. Downshift may further include a power-on downshift or a closed throttle downshift. A power-on downshift may occur when the accelerator pedal is depressed and the throttle opening is increased for acceleration. A closed throttle downshift may occur when the accelerator pedal is released and vehicle is coasting and decelerating. For example, coasting down from 40 MPH to 35 MPH may cause a coast downshift (i.e., closed throttle downshift) from $6^{th}$ gear to $5^{th}$ gear.

The upshift stage determination module 66 includes a timer 72 that is activated when an upshift is executed. The upshift stage determination module 66 determines a stage of an upshift, for example, based on elapsed time after the upshift is executed and the turbine speed.

The clutch control module 68 includes a plurality of clutch transition modules that correspond to different shift types.

For example only, the plurality of clutch transition modules may include a lift-foot upshift module 74, a power-on upshift module 75, a normal downshift module 76, and a closed throttle downshift module 80. The clutch control module 68 also includes a skip-through-neutral-downshift module 81 that controls a downshift initiated in the middle of an upshift or a closed throttle downshift. In normal situations, the clutch control module 68 selects a clutch transition module based on the shift type determined by the shift type determination module 64.

However, when a downshift request is received during an upshift, whether a lift-foot upshift or a power-on upshift, the clutch control module 68 aborts the upshift and selectively executes a normal downshift or a skip-through-neutral downshift based on the stage of the upshift. The skip-through-neutral downshift module 81 determines a downshift type based on the stage of the upshift and executes the skip-through-neutral downshift. For example, the stage of the upshift may be determined based on turbine speed progression through the shift and/or elapsed time after the upshift is triggered, if the start of ratio change has not yet been observed.

The normal downshift refers to a downshift where there is one off-going clutch and one on-coming clutch associated with the commanded gear in order to perform a gear change from the attained gear to the commanded gear, and some amount of offgoing clutch capacity is retained throughout the ratio change. In contrast, a skip-through-neutral downshift refers to a downshift that includes a period where the clutches associated with the attained gear are completely disengaged during the ratio change.

For example, when the downshift is requested earlier than a first threshold time or later than a second threshold time, the clutch control module 68 may determine a normal downshift and execute the downshift based on the normal downshift schedule in the normal downshift module 76. When the downshift is requested between the first threshold time and the second threshold time, the clutch control module 68 may determine a skip-through-neutral downshift. The skip-through-neutral downshift module 81 is activated to determine a downshift type and control the skip-through-neutral-downshift.

The skip-through-neutral-downshift module 81 determines the downshift type based on the stage of the upshift. For example, when the upshift is a 4-5 shift, the downshift types may include 4-3, 4-2, 5-3, or 5-2. The skip-through-neutral-downshift module 81 selects a downshift type and controls the downshift accordingly.

The engine torque control module 70 estimates a desired shift time and desired engine torque based on the current turbine speed, driver input, the attained gear and the commanded gear when the skip-through-neutral downshift is executed.

Generally, a shift involves disengaging an off-going clutch associated with an attained gear and engaging an on-coming clutch associated with a commanded gear. In a normal shift, the off-going clutch associated with the attained gear is gradually released while controlling the engine torque. When the off-going clutch is partially engaged, the engine speed may be increased or decreased toward a synchronous speed that corresponds to the commanded gear speed. Pressurized fluid is supplied to the fill chamber of the on-coming clutch associated with the commanded gear.

When the input shaft speed of the transmission reaches the synchronous speed, the off-going clutch is completely released and the on-coming clutch is engaged to complete the shift. The time required to release the off-going clutch and to engage the on-coming clutch is based on shift types.

In contrast, the skip-through-neutral downshift transitions the transmission 14 to a neutral state wherein both the clutches associated with the attained gear are disengaged and the ratio change is controlled using engine torque/speed control to control turbine speed change. No torque is transmitted from the engine 12 to the driveline 30 in the neutral state. Then, when the input shaft speed reaches synchronous speed, the oncoming clutches are engaged to complete the shift.

To execute a skip-through-neutral downshift during an upshift, the upshift that precedes the downshift is aborted. The transmission 14 is transitioned to the neutral state. Control valves in the hydraulic circuit 36 are reconfigured to supply pressurized fluid to the clutches associated with the commanded gear in the downshift. The engine torque control module 70 estimates a desired shift time to re-configure the control valves and to engage the clutches associated with the commanded gear. The engine torque control module 70 also estimates a desired engine torque to accelerate the transmission input shaft to the synchronous speed of the commanded gear within the desired shift time. The engine torque control module 70 controls the engine speed and torque accordingly.

Figure 3:
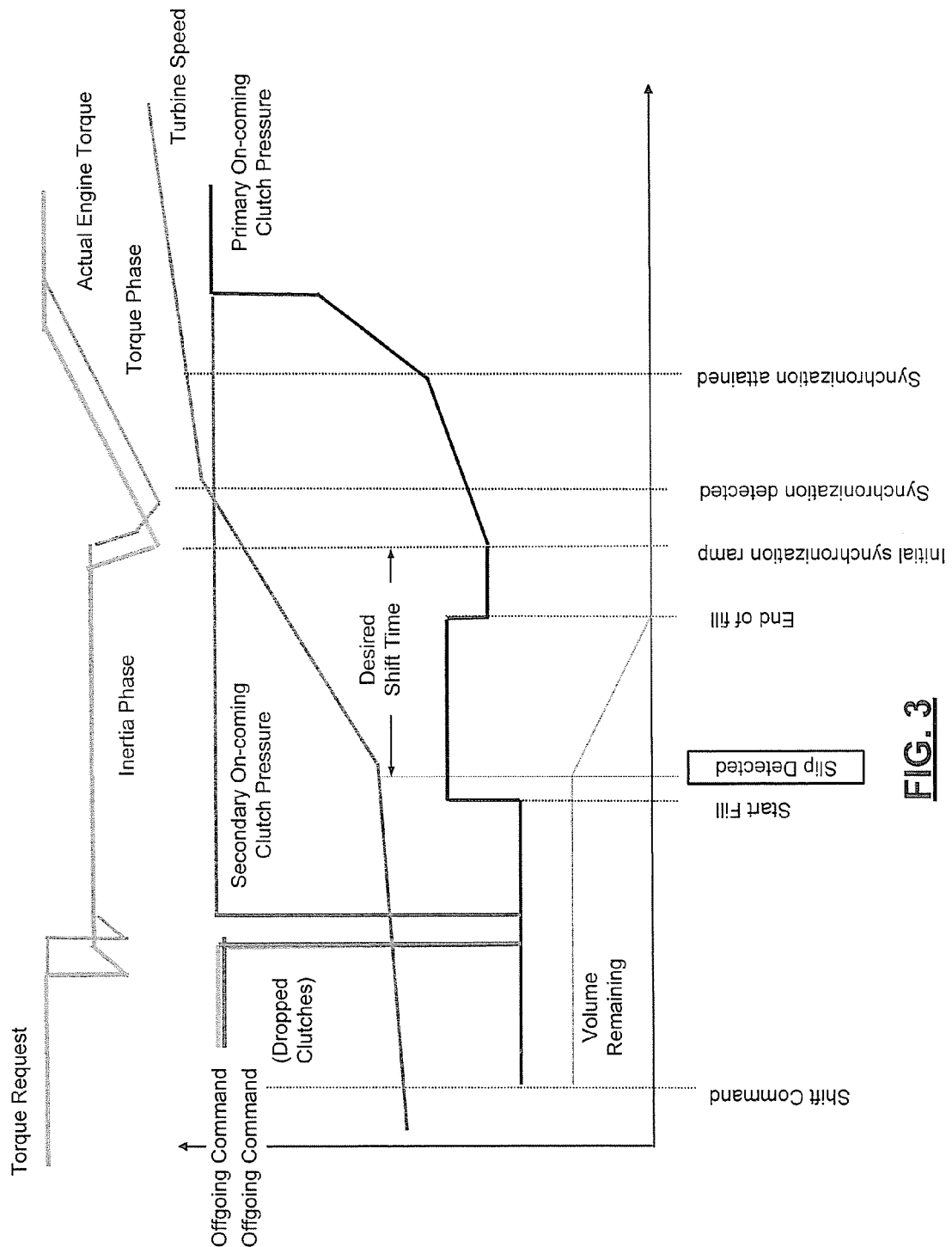
FIG. 3 is a graphical depiction of a shift summary in a powerdown skip via neutral shift (PDSVN)

An example of a skip-through-neutral downshift has been described in U.S. Pat. No. 6,656,087 to Runde, which is assigned to the assignee of the present application and the disclosure of which is incorporated herein by reference in its entirety. FIG. 3 summarizes the control events of offgoing clutches, oncoming clutches (primary & secondary) and engine torque management in a skip-through-neutral downshift.

Figure 4:
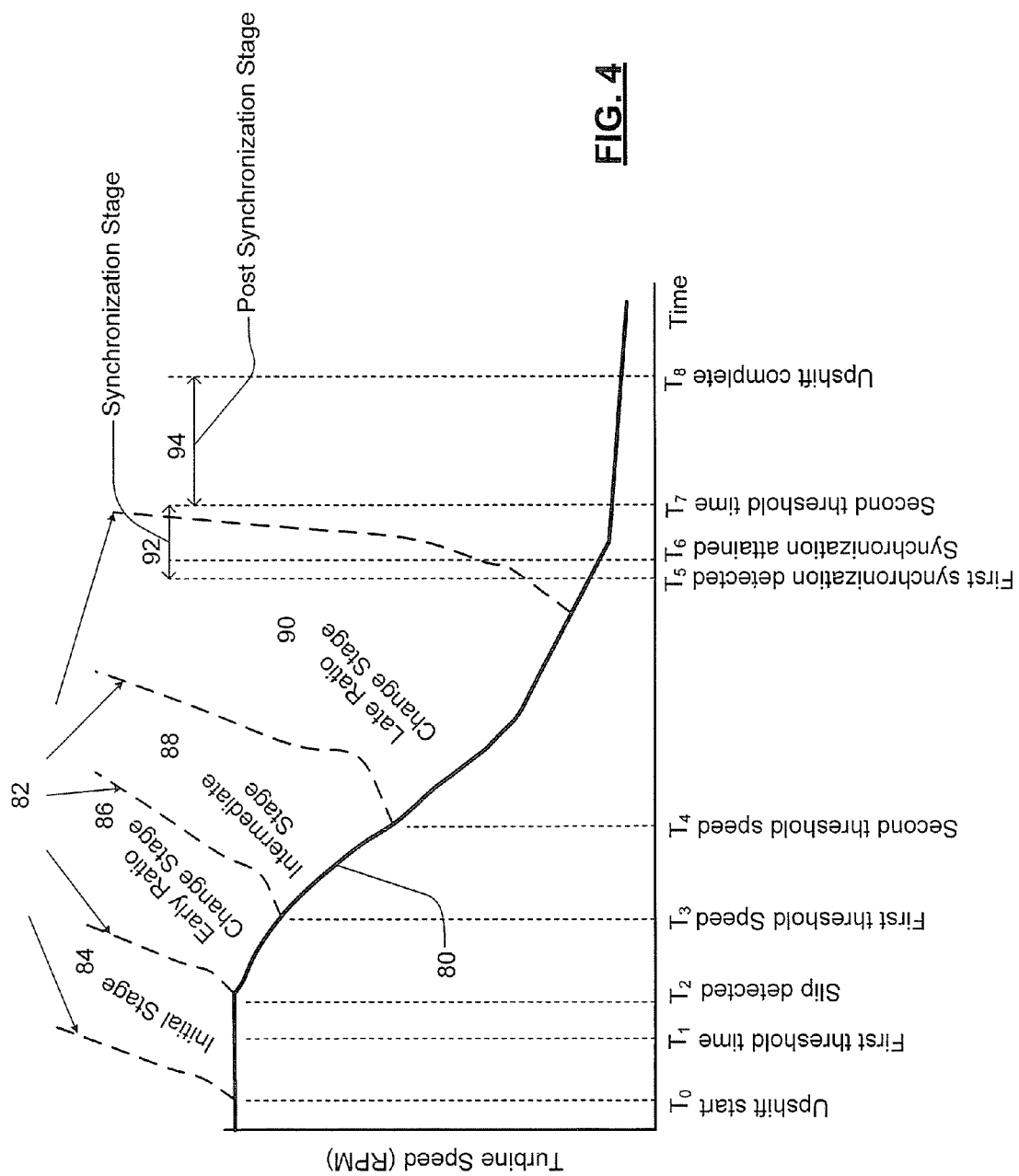
FIG. 4 is a graphical depiction of a turbine progression curve in a lift-foot upshift and the resulting turbine progression curves in a downshift if a downshift is allowed to initiate at different points of the upshift.

Referring to FIG. 4, a turbine speed progression curve 80 for a lift-foot upshift and possible turbine progression curves 82 for downshifts that may occur in different stages of the lift-foot upshift are shown. The solid line shows the turbine speed decreases during an upshift. The dashed lines show that the turbine speed increases when the lift-foot upshift is interrupted at different points of ratio change in an upshift. An upshift may include a plurality of stages from start to completion. The plurality of stages may include an initial stage 84, an early ratio change stage 86, an intermediate stage 88, a late ratio change stage 90, a synchronization stage 92, and a post synchronization stage 94.

The upshift starts at $T_0$. In the initial stage 84, the off-going clutch is still engaged and the pressurized fluid starts to be released from the chamber of the off-going clutch associated with the attained gear. The pressurized oil can be supplied to fill the chamber of one or more of the on-coming clutches. In this initial stage 84, no slip is detected and the engine speed is not changed and the offgoing clutches still have residual capacity. A first threshold time $T_1$ may fall in the initial stage, if clutch slip is detected prior to reaching this time. The clutch control module 68 determines a normal downshift or a skip-through-neutral downshift based on the first threshold time $T_1$. The clutch control module 68 determines a normal downshift when the elapsed time is less than the first threshold time $T_1$ and determines a skip through neutral downshift when the elapsed time is equal to or greater than the first threshold time $T_1$.

The early ratio change stage 86 starts at time $T_2$ when a slip is detected. Slip occurs when the turbine speed becomes different from the current gear speed. The turbine speed starts to decrease as the engine speed decreases. In the early ratio change stage 86, the turbine speed is less than a first threshold speed at $T_3$ and the turbine speed is still close to the attained gear speed. When a slip occurs, the offgoing clutch is mostly disengaged, enough to slip at this point and starts exhausting.

The intermediate stage 88 occurs when the turbine speed is greater than a first threshold speed at $T_3$ and is less than the second threshold speed at $T_4$. This intermediate stage is primarily intended for jump-upshift aborts. A two-step ratio change is termed as jump shift. For example, 2-4, 3-5, 4-6 upshifts are considered as jump-upshifts and 4-2, 5-3, 6-4 are termed as jump-downshifts. Both offgoing clutches have completely released and the gearbox is in a neutral state.

In the late ratio change stage 90, the turbine speed is greater than the second threshold speed at $T_4$ but has not attained a synchronous speed of the commanded gear. The transmission is operating at a gear ratio close to the commanded gear ratio. During the late ratio change stage, the applied chamber of the on-coming clutch has filled and applied sufficiently to affect the ratio change. Therefore, a piston associated with the on-coming clutch is capable of applying a force to an associated clutch plate to develop torque capacity beyond the initial return spring pressure.

The synchronization stage 92 starts when the turbine speed has attained the synchronous speed of the commanded gear to provide the commanded gear ratio at $T_5$. The on-coming clutch starts to be engaged to the commanded gear. Since there are no offgoing clutches maintaining the capacity, the torque of the on-coming clutch picks up the entire load, engine torque reduction is used to maintain synchronous speed and prevent flare. At this stage, the turbine speed is decreased to the commanded gear speed within certain RPM range for a predetermined amount of time to retain the synchronization attained state.

The post synchronization stage 94 starts after synchronization is attained at time $T_6$ but the elapsed time is less than a second threshold time $T_7$.

The clutch control module 68 aborts the upshift and selectively executes a normal downshift or a skip-through-neutral downshift based on the stage of the upshift when a downshift is requested. For example only, when the downshift is requested before the first threshold time $T_1$, a normal downshift is executed. When the downshift is requested between the first threshold time $T_1$ and the second threshold time $T_7$, a skip-through-neutral downshift is executed.

More specifically, when the downshift is requested during any stages of an upshift, a skip-through-neutral shift can be executed, if the feature is calibrated accordingly. However, there can be an exception to this, wherein driver steps in before the first threshold time $T_1$ and the requested gear is equal to the attained gear of an upshift, the clutch control module 68 supplies pressurized fluid to re-fill the chamber of the off-going clutch and discharges the pressurized fluid from the chamber of the on-coming clutch. This type of shift sequence is termed as Return to Previous Range (RPR).

When the downshift is requested during an upshift, for the purpose of determining appropriate skip-through-neutral shift type, an upshift abort is categorized into different stages depending on the location of driver's request for a downshift in relation to the turbine speed.

As shown in FIG. 4, this is clearly explained using $T_1$ (first threshold constant) and $T_7$ (second threshold constant). If a downshift is requested between start of an upshift and $T_1$, the skip-through-neutral shift type falls under the initial stage 84. Similarly, between $T_2$ and $T_3$, it is the early ratio stage 86. The intermediate stage 88 is between $T_3$ and $T_4$. The late ratio change stage 90 occurs between $T_4$ and $T_5$. Once the appropriate skip-through-neutral shift type is determined based on the stages mentioned, the clutch control module 68 disengages clutches associated with the attained gear and applies clutches associated with commanded gear at synchronization. The transmission 14 is transitioned to a neutral state.

In FIG. 5, clutch configuration for all possible shift types, including engagement and dis-engagement of clutches are explained in a tabular form. For example only, in a 4-5 upshift, the attained gear is the fourth gear and the commanded gear is the fifth gear. C1 is the off-going clutch and C3 is the oncoming clutch.

After the upshift is started and before the upshift is completed, the driver may depress the accelerator pedal to request a downshift. One such case is an RPR (Return to Previous Range), wherein the driver requests for a downshift to a gear (commanded gear) same as attained gear of an upshift. For example only, in a 4-5 upshift, if the driver requests for a downshift into a $4^{th}$ gear, C3 clutch (oncoming clutch in 4-5 upshift) is immediately dropped, C1 clutch (offgoing clutch in 4-5 upshift) becomes oncoming clutch and is ramped at high pressure to complete the shift (RPR). During an RPR if the driver crowds on the throttle and there is a request for new commanded gear, a skip-through-neutral shift can be commanded to honor driver's request for a lower gear downshift.

When the downshift is requested within the early ratio change stage 86, the turbine speed is considered to be close to the attained gear speed. Similarly, if a downshift is requested within the intermediate stage 88 or the late ratio change stage 90, the turbine speed is considered to be close to the commanded gear. For example only, in a 4-5 upshift, if a downshift is requested, according to the stage determination, the skip-through-neutral-downshift module 81 determines a 4-2 or 4-3 shift type depending on the drivers request for a second or third gear respectively.

The engine torque control module 70 estimates a required shift time to re-configure the control valves and engage clutches (for example, C1 and C4 in a 4-2 downshift) associated with a commanded gear of the downshift. The engine torque control module 70 also determines required engine torque for accelerating the transmission input speed to the synchronous speed of the commanded gear. The engine torque control module 70 controls the engine torque output and increases the transmission input speed to the synchronous speed over the desired shift time. The methodology adopted to control engine torque management has been disclosed in U.S. Pat. No. 7,212,898 to Whitton et al. and assigned to the present assignee. Simultaneously, the clutches (i.e., C1 and C2) associated with the attained gear (i.e., fourth gear) are disengaged, the clutch control module 68 re-configures the control valves to engage the clutches (i.e., C1 and C4) associated with the commanded gear (i.e., the second gear).

When the downshift is requested in the late ratio change stage 90 or the synchronization stage, the turbine speed is close to the speed of the commanded gear of the upshift. The skip-through-neutral-downshift module 81 determines the downshift as a 5-2 or 5-3 shift type, similar to the example mentioned in the preceding section. The commanded gear of the upshift becomes the attained gear of the downshift.

Figure 6:
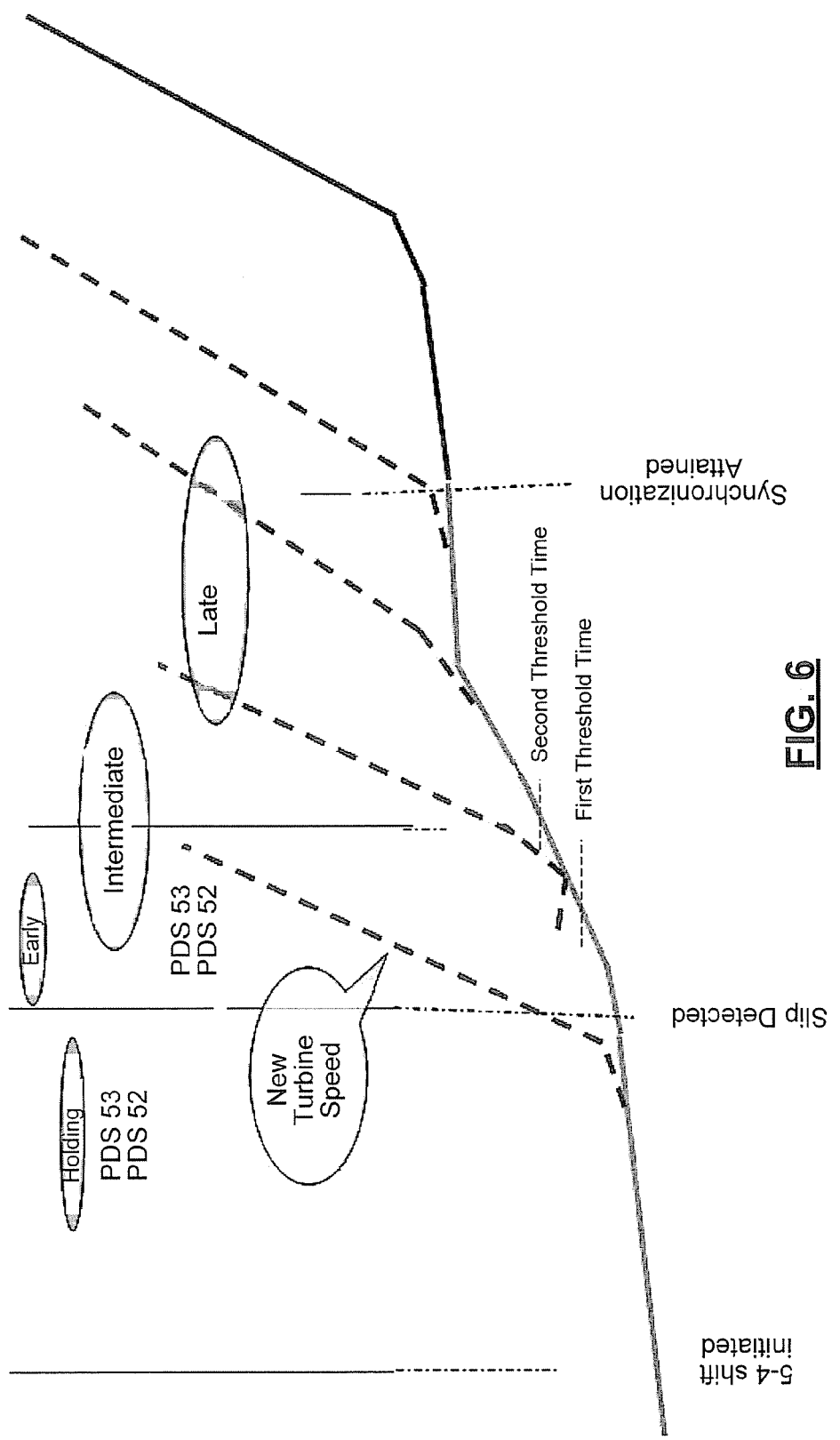
FIG. 6 is a graphical depiction of a turbine progression curve in a closed throttle downshift and the resulting turbine progression curves in a downshift if a downshift is allowed to initiate at different points of the closed throttle downshift.

Referring to FIG. 6, the skip-through neutral downshift of the present disclosure is applicable to a closed throttle downshift to indicate a skip-through neutral downshift in the middle of a closed throttle downshift. The solid line prior to the attainment of synchronization is a graphical depiction of a turbine speed ratio in a closed throttle downshift. The dashed lines show resulting turbine progression curves of a skip-through neutral downshift if a downshift is allowed to initiate at different points of the closed throttle downshift. As in the lift-foot upshift of FIG. 4, the closed throttle downshift may include different stages, including but not limited to, early ratio change, intermediate stage and late ratio change.

While not shown in FIG. 2, it is understood and appreciated that a downshift stage determination module may be included to perform a function similar to that of the upshift stage determination module 66. The downshift stage determination module may communicate with the shift type determination module 64, the clutch control module 68 and the engine torque control module 70 and may include a timer to record the elapsed time when a closed throttle downshift is initiated. Based on where the driver steps-in during a closed throttle downshift a skip-through neutral downshift can be initiated.

Referring now to FIG. 7, a method 100 for controlling transmission shift starts in step 102. The shift type determination module 64 determines a desired shift type in step 104. The clutch control module 68 selects a clutch transition schedule and executes a shift according to step 106. When the shift type is an upshift or a closed throttle downshift in step 108, the upshift stage determination module 66 determines whether the upshift or a closed throttle downshift is completed in step 110. When the upshift or the closed throttle downshift is not completed in step 110, the shift type determination module 64 determines whether a downshift is requested in step 112.

When a downshift is requested before the upshift or the closed throttle downshift is completed, the upshift stage determination module 66 or a downshift stage determination module determines the stage of the upshift or the closed throttle downshift in step 114. When the elapsed time is between the first threshold time and the second threshold time in step 116, the clutch control module 68 aborts the upshift or the closed throttle downshift and executes a skip-through-neutral downshift based on the stage of the upshift or the closed throttle downshift in step 118. When the elapsed time is less than the first threshold time or greater than the second threshold time in step 116, the clutch control module 68 aborts the upshift or the closed throttle downshift and executes a normal downshift based on the stage of the upshift or the closed throttle downshift in step 120. The method 100 ends in step 122.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A transmission shift control system comprising:
   a transmission shift control module that executes an upshift or a closed-throttle downshift;
   a shift stage determination module that determines a stage of the upshift or the closed-throttle downshift when a downshift is requested; and
   a clutch control module that determines a downshift type based on the stage of the upshift or the closed-throttle downshift and selectively executes the downshift type before the upshift or the closed throttle downshift is completed.

2. The transmission shift control module of claim 1 wherein the upshift is a lift-foot upshift or a power-on upshift.

3. The transmission shift control module of claim 1 wherein the closed throttle downshift is aborted into a skip-through-neutral shift based on a driver's downshift request by depressing an accelerator pedal and the stage of the closed throttle downshift.

4. The transmission shift control system of claim 1 wherein the downshift is a normal downshift or a skip-through-neutral downshift.

5. The transmission shift control system of claim 4 wherein an off-going clutch associated with an attained gear and an on-coming clutch associated with a commanded gear are controlled throughout the normal downshift.

6. The transmission shift control system of claim 4 wherein the skip-through-neutral downshift puts a transmission in a neutral state for a predetermined period.

7. The transmission shift control system of claim 6 wherein clutches associated with an attained gear and clutches associated with a commanded gear are disengaged in the neutral state.

8. The transmission shift control system of claim 7 wherein the skip-through-neutral downshift is executed when elapsed time of the upshift or the closed throttle downshift is between first threshold time and second threshold time.

9. The transmission shift control system of claim 8 wherein the first threshold time occurs before a gear ratio starts to change.

10. The transmission shift control system of claim 8 wherein the second threshold time occurs after a commanded gear reaches a synchronous speed.

11. The transmission shift control system of claim 8 further comprising an engine torque control module that controls engine torque output based on turbine speed, the stage of the upshift or the closed throttle downshift, commanded gear ratio, and attained gear ratio to execute the skip-through-neutral downshift.

12. The transmission shift control system of claim 11 wherein the engine torque control module estimates a desired engine torque output to accelerate a transmission input shaft to a synchronous speed of a commanded gear within a desired shift time.

13. A method for controlling gear shift, comprising:
    executing one of an upshift or a closed throttle downshift;
    determining a stage of the upshift or the closed throttle downshift when a downshift is requested;
    determining a downshift type based on the stage of the upshift or the closed throttle downshift; and
    selectively executing the downshift type based on the stage of the upshift or the closed throttle downshift before the upshift or the closed throttle downshift is completed.

14. The method of claim 13 wherein the upshift is a lift-foot upshift or a power-on upshift.

15. The method of claim 13 wherein the closed throttle downshift is aborted into a skip-through-neutral downshift based on a driver's downshift request by depressing an accelerator pedal and the stage of closed throttle downshift.

16. The method of claim 13 wherein the downshift is a normal downshift or a skip-through-neutral downshift.

17. The method of claim 16 further comprising executing the skip-through-neutral downshift when elapsed time of the upshift or the closed throttle downshift is between a first threshold time and a second threshold time.

18. The method of claim 17 further comprising aborting the upshift or the closed throttle downshift and transitioning a transmission into a neutral state while executing the skip-through-neutral downshift.

19. The method of claim 17 further comprising estimating a desired shift time based on the stage of the upshift or the closed throttle downshift when the skip-through-neutral downshift is executed.

20. The method of claim 17 further comprising controlling engine torque based on the stage of the upshift or the closed throttle downshift when the skip-through-neutral downshift is executed.

* * * * *